United States Patent
Nguyen et al.

(10) Patent No.: US 7,702,971 B2
(45) Date of Patent: Apr. 20, 2010

(54) SYSTEM AND METHOD FOR PREDICTIVE FAILURE DETECTION

(75) Inventors: Tuyet-Huong T. Nguyen, Austin, TX (US); Mukund Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 293 days.

(21) Appl. No.: 11/759,088

(22) Filed: Jun. 6, 2007

(65) Prior Publication Data

US 2008/0307273 A1  Dec. 11, 2008

(51) Int. Cl.
*G06F 11/00* (2006.01)
*H03M 13/00* (2006.01)
*G11B 5/09* (2006.01)

(52) U.S. Cl. ............... 714/704; 714/762; 714/821; 360/53

(58) Field of Classification Search ........... 714/704, 714/755, 805, E11.053, 800, 751
See application file for complete search history.

(56) References Cited

U.S. PATENT DOCUMENTS

| | | | |
|---|---|---|---|
| 4,709,202 A | 11/1987 | Koenck et al. | 320/43 |
| 4,845,419 A | 7/1989 | Hacker | 320/39 |
| 5,220,567 A * | 6/1993 | Dooley et al. | 714/704 |
| 6,202,174 B1 * | 3/2001 | Lee et al. | 714/38 |
| 6,453,431 B1 | 9/2002 | Bernstein et al. | 714/700 |
| 6,839,868 B1 | 1/2005 | Pignol | 714/42 |
| 6,851,071 B2 | 2/2005 | Bossen et al. | 714/5 |
| 6,851,074 B2 | 2/2005 | Miloiicic et al. | 714/20 |
| 7,076,686 B2 | 7/2006 | La Fetra | 714/6 |
| 7,124,332 B2 * | 10/2006 | Constantinescu | 714/52 |

* cited by examiner

*Primary Examiner*—Kevin L Ellis
*Assistant Examiner*—Daniel F McMahon
(74) *Attorney, Agent, or Firm*—Baker Botts L.L.P.

(57) ABSTRACT

A method of predicting failure of an information handling device, such as a server, by monitoring an error rate, i.e., n errors per error period. Errors are reported only if the error rate is exceeded. An error count is kept, and errors are leaked from the count if the time difference between errors is more than the error period.

16 Claims, 2 Drawing Sheets

SYSTEM AND METHOD FOR PREDICTIVE FAILURE DETECTION

TECHNICAL FIELD

The present disclosure relates generally to information handling systems and, more particularly, to a system and method for hardware pre-failure detection and alerting.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An enterprise system, such as a shared storage cluster, is one example of an information handling system. The storage cluster typically includes interconnected servers that can access a plurality of storage devices.

Typically, a server system has some sort of software mechanism for pre-failure detection on various hardware. A pre-failure detection process monitors hardware such as memory or buses for impending failures. If an impending failure is detected, the process provides advance warning to an operator who can then take appropriate measures. Specific examples of pre-failure detection are of various interfaces, such as tracking errors of memory, IO, and CPU caches.

SUMMARY

One embodiment of the present disclosure is a pre-failure detection process. This process monitors hardware such as memory for impending failures. If an impending failure is detected, the process provides advance warning to an operator who can then take appropriate measures.

More specifically, the process is directed to tracking a rate of errors. In other words, the process is based on the notion that a certain number of errors within a certain period of time (an "error period") is a good measure of potential for future uncorrectable memory errors.

The error prediction process is triggered upon the detection of an error. Examples of errors that trigger the error handler are ECC (error correction code) memory errors, PCIe errors (CRC errors), other bus errors, and CPU cache errors.

The process uses a "leaky bucket" approach to monitor the error rate. Errors are leaked from an error counter as part of the determination of whether the rate of errors is acceptable. The leak rate is calculated, as opposed to being a "hardware-driven" pre-set leak rate.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For purposes of example, the following description is directed to predicting failures of hardware associated with a server system. However, the same concepts could be applied to predicting failures associated with any other type of information handling system.

Figure 1:
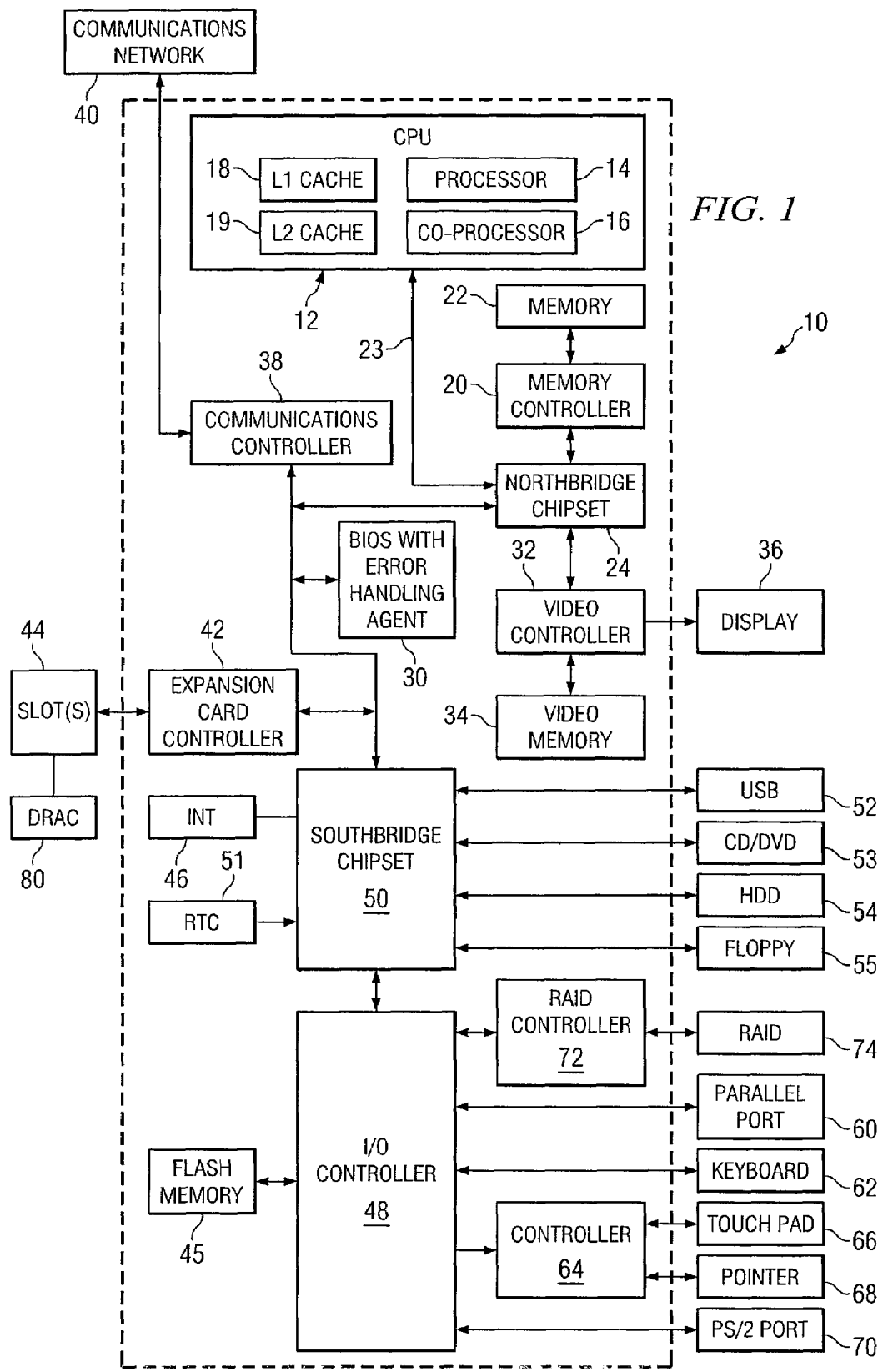
FIG. 1 is a block diagram showing a server.

FIG. 1 is a block diagram of the basic components of an example of a server 10. Front-panel LEDs signal power and disk activity. A single 10/100/1000 LAN connector is provided, as well as USB connectors. An IDE interface provides support for CD/DVD drives. A four-channel SATA interface is available for system disks and software RAID. An optional SATA or SCSI RAID controller provides hardware RAID, implemented with PCI-X cards. Hot-pluggable SCSI drive bays are also optional.

In one example embodiment, information handling system is a Dell™ PowerEdge™ server. Information handling system 10 may include one or more microprocessors such as central processing unit (CPU) 12, for example. CPU 12 may include processor 14 for handling integer operations and coprocessor 16 for handling floating point operations. CPU 12 may be coupled to cache, such as L1 cache 18 and L2 cache 19, and a chipset, commonly referred to as Northbridge chipset 24, via a frontside bus 23. Northbridge chipset 24 may couple CPU 12 to memory 22 via memory controller 20. Main memory 22 of dynamic random access memory (DRAM) modules may be divided into one or more areas, such as system management mode (SMM) memory area (not expressly shown), for example.

Graphics controller 32 may be coupled to Northbridge chipset 24 and to video memory 34. Video memory 34 may be operable to store information to be displayed on one or more display panels 36. Display panel 36 may be an active matrix or passive matrix liquid crystal display (LCD), a cathode ray tube (CRT) display or other display technology. In selected applications, uses or instances, graphics controller 32 may also be coupled to an integrated display, such as in a portable information handling system implementation.

Northbridge chipset 24 may serve as a "bridge" between CPU bus 23 and the connected buses. Generally, when going from one bus to another bus, a bridge is needed to provide the translation or redirection to the correct bus. Typically, each bus uses its own set of protocols or rules to define the transfer of data or information along the bus, commonly referred to as the bus architecture. To prevent communication problem from arising between buses, chipsets such as Northbridge chipset 24 and Southbridge chipset 50, are able to translate and coordinate the exchange of information between the various buses and/or devices that communicate through their respective bridge.

Basic input/output system (BIOS) memory 30 may also be coupled to PCI bus connecting to Southbridge chipset 50. FLASH memory or other reprogrammable, nonvolatile memory may be used as BIOS memory 30. A BIOS program (not expressly shown) is typically stored in BIOS memory 30. The BIOS program may include software which facilitates interaction with and between information handling system 10 devices such as a keyboard 62, a mouse such as touch pad 66 or pointer 68, or one or more I/O devices, for example. BIOS memory 30 may also store system code (note expressly shown) operable to control a plurality of basic information handling system 10 operations.

Communication controller 38 may enable information handling system 10 to communicate with communication network 40, e.g., an Ethernet network. Communication network 40 may include a local area network (LAN), wide area network (WAN), Internet, Intranet, wireless broadband or the like. Communication controller 38 may be employed to form a network interface for communicating with other information handling systems (not expressly shown) coupled to communication network 40.

In certain information handling system embodiments, expansion card controller 42 may also be included and may be coupled to a PCI bus. Expansion card controller 42 may be coupled to a plurality of information handling system expansion slots 44. Expansion slots 44 may be configured to receive one or more computer components such as an expansion card (e.g., modems, fax cards, communications cards, and other input/output (I/O) devices).

Southbridge chipset 50, also called bus interface controller or expansion bus controller may couple PCI bus 25 to an expansion bus. Various bus configurations, such as a Peripheral Component Interconnect ("PCI") bus, or PCIe (PCI Express) bus may be used.

Interrupt request generator 46 may also be coupled to Southbridge chipset 50. Interrupt request generator 46 may be operable to issue an interrupt service request over a predetermined interrupt request line in response to receipt of a request to issue interrupt instruction from CPU 12. Southbridge chipset 40 may interface to one or more universal serial bus (USB) ports 52, CD-ROM (compact disk-read only memory) or digital versatile disk (DVD) drive 53, an integrated drive electronics (IDE) hard drive device (HDD) 54 and/or a floppy disk drive (FDD) 55, for example. In one example embodiment, Southbridge chipset 50 interfaces with HDD 54 via an IDE bus (not expressly shown). Other disk drive devices (not expressly shown) which may be interfaced to Southbridge chipset 50 may include a removable hard drive, a zip drive, a CD-RW (compact disk-read/write) drive, and/or a CD-DVD (compact disk-digital versatile disk) drive, for example.

Real-time clock (RTC) 51 may also be coupled to Southbridge chipset 50. Inclusion of RTC 51 may permit timed events or alarms to be activated in the information handling system 10. Real-time clock 51 may be programmed to generate an alarm signal at a predetermined time as well as to perform other operations.

I/O controller 48, often referred to as a super I/O controller, may also be coupled to Southbridge chipset 50. I/O controller 48 may interface to one or more parallel port 60, keyboard 62, device controller 64 operable to drive and interface with touch pad 66, pointer 68, and/or PS/2 Port 70, for example. FLASH memory or other nonvolatile memory may be used with I/O controller 48.

RAID 74 may also couple with I/O controller using interface RAID controller 72. In other embodiments, RAID 74 may couple directly to the motherboard (not expressly shown) using a RAID-on-chip circuit (not expressly shown) formed on the motherboard.

Generally, chipsets 24 and 50 may further include decode registers to coordinate the transfer of information between CPU 12 and a respective data bus and/or device. Because the number of decode registers available to chipset 24 or 50 may be limited, chipset 24 and/or 50 may increase the number or I/O decode ranges using system management interrupts (SMI) traps.

Information handling system 10 may also include a remote access card such as Dell™ remote access card (DRAC) 80. Although the remote access card is shown, information handling system may include any hardware device that allows for communications with information handling system 10. In some embodiments, communications using the hardware device with information handling system 10 is performed using an out-of-band channel. For example, in a shared storage system, several cluster nodes may be in communications using a variety of channels to exchange data. The out-of-band channel would be any communication channel that is not being used for data exchange.

A feature of the management software of server 10 is a pre-failure detection and alert process. This process monitors hardware such as hard drives and memory for impending failures. If an impending failure is detected, the process provides advance warning to an operator who can then take appropriate measures.

Conventionally, pre-failure detection processes detect, track, and log each individual memory error. A correctable memory error is assumed to be indicative of future uncorrectable problems and the need to replace the memory hardware. However, with increased density of memory devices at the DRAM and DIMM level, it can be expected that some small number of errors will occur during a given period of access time, and not necessarily indicative memory failure.

Thus, the pre-failure detection process described herein is directed to tracking a rate of errors. In other words, the process is based on the notion that a certain number of errors within a certain period of time is a good measure of potential for future uncorrectable memory errors.

The error prediction process described herein is implemented as a software "error handler", and is triggered upon the detection of an error. The error handler may be integrated with various other software of server 10. As examples, the error handler may be part of BIOS, or part of an operating system or service processor that monitors and analyzes errors. For purposes of this description, the error handler is described in terms of implementation in BIOS.

Examples of errors that trigger the error handler are ECC (error correction code) memory errors, PCIe errors (CRC errors), other bus errors, and CPU cache errors. Typically, the error handler is used with correctable (as opposed to uncorrectable errors) because those errors are deemed to predict future hardware failure. However, the error handler can be used with any type of error.

The fault detection process described herein is a "leaky bucket" approach. In general usage, this term refers to a process that increments a counter for each event of interest and periodically decrements the counter. If the event were to occur more times than "normal" within a short time period, the counter would overflow, causing an alert to be generated.

Figure 2:
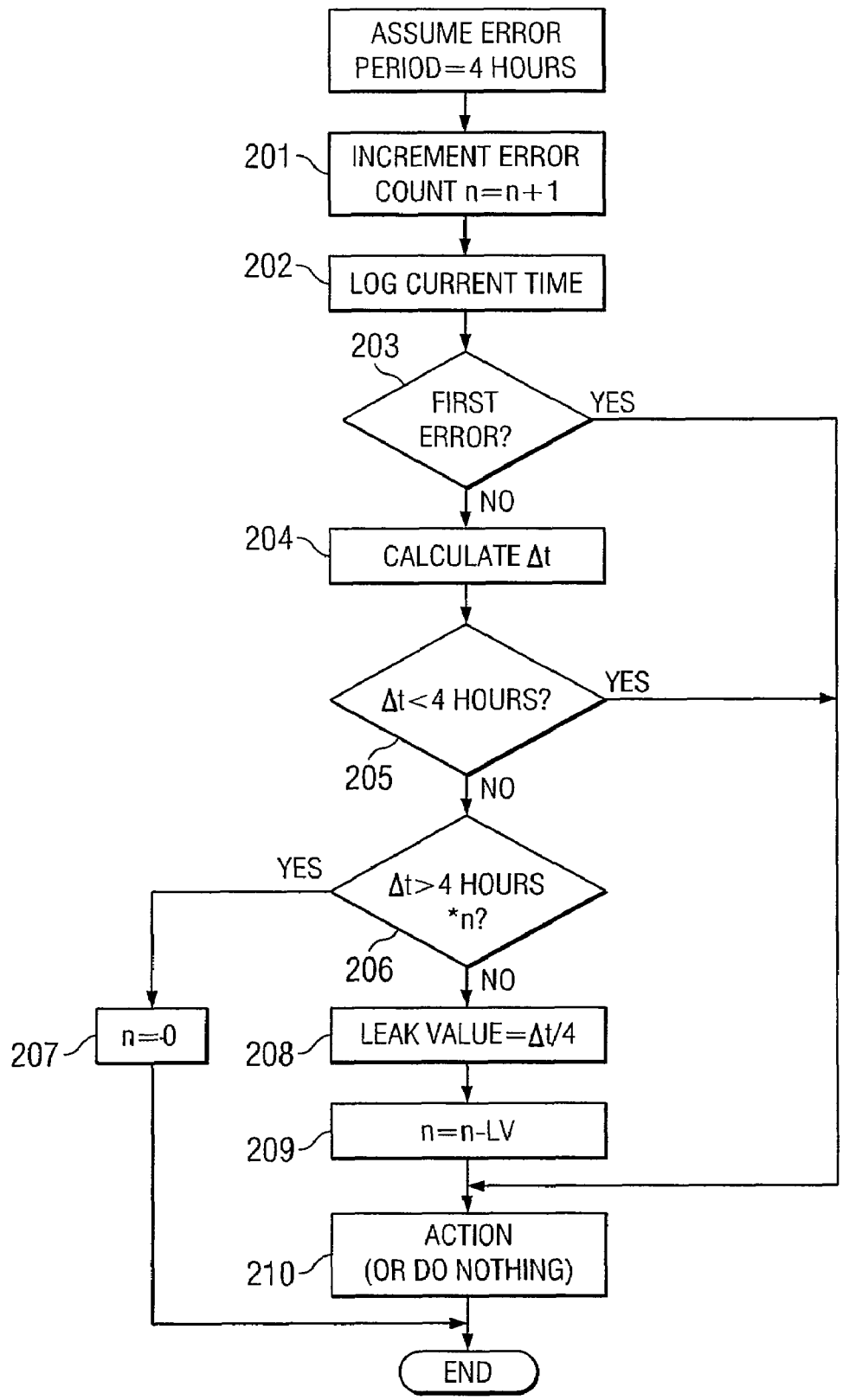
FIG. 2 illustrates the error handling process implemented by programming of the server of FIG. 1.

FIG. 2 illustrates a method of handling errors in accordance with one embodiment of the invention. The method is implemented with appropriate programming to carry out the steps of the method, referred to herein as an "error handler". The error handler may be implemented with programming of BIOS 30. The programming is stored in memory of server 10, and may be part of more comprehensive server management programming, such as that of a management controller.

For the purposes of this description, the process is described in terms of detecting memory ECC errors associated with DIMM memory devices. As explained below, the process does not report every instance of an error. Instead, the process tracks an error rate. To this end, each memory device (i.e., each DIMM) has an associated software counter. The allowable error rate is a pre-determined number of errors within a pre-determined time window.

When the error count (as determined by the error rate) exceeds a pre-determined threshold (i.e., 15 errors in 4 hours), some action may be taken such as logging a warning to an event log. Depending on the specific implementation of the process, more than one warning event may be logged, with the same or different error rates or thresholds. The logging may vary depending on the type of error. Also, the detection may vary depending on the operational mode of the server (i.e., diagnostic versus normal operation).

As explained in further detail below, each error and its time stamp are stored in memory. This step is performed by BIOS of the server 10, and is invoked via an SMI (service management interrupt) event. The error handler increments the error count, decrements the error count, or clears the error count, depending on the difference between the next previous time stamp and the current time. Thus, the process is not based on periodic polling, but rather on a comparison to a time base when each new error event occurs.

In the example of FIG. 2, one error every four hours is the pre-determined allowable error rate. Thus, the "error rate" is one error per four hours, and the "error period" is four hours.

In Step 201, an error has occurred, and the count is incremented. The current error count is referred to herein as "n". In Step 202, the current time stamp associated with the error is logged.

In Step 203, the process determines whether the current error is the first error. If it is the first error, there are no errors to "leak" from the error count, and the process goes to Step 210, explained below.

If the error is not the first error, the process goes to Step 204, which is calculating the time between the previous time stamp and the current time. This time difference is referred to herein as $\Delta t$.

In Step 205, the process determines whether the time difference, $\Delta t$, is less than four hours. If so, because it has already been determined that the error is not the first error, the allowable rate is exceeded, and the process goes to Step 210, explained below. In this case, where the acceptable error rate has been exceeded, some sort of data representing a predicted failure is generated. For example, an error may be logged.

If the time difference is not less than four hours, the process determines how many errors to leak from the error count. Step 206 is determining whether the new error occurs after the error period multiplied by the error count, i.e., 4*n.

If so, the process clears the error count in Step 207, and ends (until the next error). For example, if the error count is 4 and $\Delta t$ is 17 hours, then 17>4*4. All the errors can be leaked from the error count.

If not, the process goes to Step 208, which is calculating a "leak value". In Step 209, the process decrements the error count by the leak value. For example, if the error count is 4 and $\Delta t$ is 12 hours, then 12<4*4. The leak value is $\Delta t$ divided by the error period, here $\Delta t/4=3$. Three errors are leaked from the error count.

In this manner, if there is only one error every four hours, no error is reported as a predicted failure. Errors are reported only if they occur more than once during the error period. Errors are leaked if the difference between the time stamps is more than four hours, that is, if the new error occurs more than four hours after the previous error. One error is leaked from the error counter for every four hours.

In Step 210, the process acts on the error count. Examples of appropriate actions, depending on the error count, are doing nothing or logging a warning. Step 210 may be performed by simply sending an appropriate signal to some other failure management programming.

Although the disclosed embodiments have been described in detail, it should be understood that various changes, substitutions and alterations can be made to the embodiments without departing from their spirit and scope.

What is claimed is:

1. A method of predicting failure of an information handling system, comprising:
    determining an error period;
    determining that an error has occurred;
    incrementing an error count;
    if the error is the first error of the error count, waiting until a next error:
    if the error is not the first error of the error count, such that there is a previous error determining a time difference between the error and the previous error;
    if the time difference is less than the error period, generating data representing a predicted failure;
    if the time difference is greater than the error period, calculating the product of the error period and the error count;
    if the time difference is greater than the product of the error period and the error count, clearing the error count;
    if the time difference is less than the product of the error period and the error count, decrementing the error count by a leak value representing the time difference divided by the error period; and
    repeating the above steps for each new error.

2. The method of claim 1, wherein the error is a correctable error.

3. The method of claim 1, wherein the method is performed by BIOS of the information handling system.

4. The method of claim 3, wherein the step of determining that an error has occurred is performed by receiving an interrupt signal.

5. The method of claim 1, wherein the method is performed by an operating system.

6. The method of claim 1, wherein the method is performed by a service processor.

7. The method of claim 1, wherein the errors are a type from the group of error types: ECC errors or CRC errors.

8. The method of claim 1, wherein the errors are a type from the following error types: memory errors, bus errors, and CPU cache errors.

9. A computer-readable medium having computer-executable instructions that when executed predict failure of an information handling system, comprising: instructions that when executed perform the following operations:

determining an error period;

determining that an error has occurred;

incrementing an error count;

if the error is the first error of the error count, waiting until a next error;

if the error is not the first error of the error count, such that there is a previous error, determining a time difference between the error and the previous error;

if the time difference is less than the error period, generating data representing a predicted failure;

if the time difference is greater than the error period, determining calculating the product of the error period and the error count;

if the time difference is greater than the product of the error period and the error count, clearing the error count;

if the time difference is less than the product of the error period and the error count, decrementing the error count by a leak value representing the time difference divided by the error period; and repeating the above steps for each new error.

10. The computer-readable medium of claim 9, wherein the error is a correctable error.

11. The computer-readable medium of claim 9, wherein the method is performed by BIOS of the information handling system.

12. The computer-readable medium of claim 11, wherein the step of determining that an error has occurred is performed by receiving an interrupt signal.

13. The computer readable medium of claim 9, wherein the computer readable medium is part of an operating system.

14. The computer readable medium of claim 9, wherein the computer readable medium is implemented with a service processor.

15. The computer-readable medium of claim 9, wherein the errors are a type from the group of error types: ECC errors or CRC errors.

16. The computer-readable medium of claim 9, wherein the errors are a type from the following error types: memory errors, bus errors, and CPU cache errors.

* * * * *